US011329930B2

(12) United States Patent
Bregman et al.

(10) Patent No.: US 11,329,930 B2
(45) Date of Patent: May 10, 2022

(54) GENERATING SCENARIOS FOR AUTOMATED EXECUTION OF RESOURCES IN A CLOUD COMPUTING ENVIRONMENT

(71) Applicant: Red Hat, Inc., Raleigh, NC (US)

(72) Inventors: Arie Bregman, Raanana (IL); Eran Kuris, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/424,685

(22) Filed: May 29, 2019

(65) Prior Publication Data

US 2020/0382438 A1  Dec. 3, 2020

(51) Int. Cl.
| | |
|---|---|
| *G06F 15/173* | (2006.01) |
| *H04L 47/70* | (2022.01) |
| *H04L 43/08* | (2022.01) |
| *H04L 67/10* | (2022.01) |
| *G06F 15/16* | (2006.01) |

(52) U.S. Cl.
CPC ............ *H04L 47/70* (2013.01); *H04L 43/08* (2013.01); *H04L 67/10* (2013.01)

(58) Field of Classification Search
CPC .......... H04L 67/70; H04L 43/08; H04L 67/10
USPC .................................................. 709/217, 224
See application file for complete search history.

(56) References Cited

U.S. PATENT DOCUMENTS

| | | | |
|---|---|---|---|
| 9,094,415 B2 | 7/2015 | Olsen et al. | |
| 9,350,681 B1 * | 5/2016 | Kitagawa | ............ H04L 41/5096 |
| 9,825,823 B2 * | 11/2017 | Maes | ..................... G06F 9/5072 |
| 2006/0041458 A1 * | 2/2006 | Ringrose | .............. G06Q 10/063 705/7.11 |
| 2011/0029141 A1 * | 2/2011 | Sun | ......................... G05B 13/02 700/291 |
| 2011/0208557 A1 * | 8/2011 | Gonzalez Diaz | ........................... G06Q 10/063112 705/7.14 |
| 2012/0166323 A1 * | 6/2012 | Guo | .................... G06F 11/3409 705/34 |

(Continued)

FOREIGN PATENT DOCUMENTS

WO    2018208472 A1    11/2018

OTHER PUBLICATIONS

HelpSystems, "Orchestration on the Private Cloud", https://www.helpsystems.com/blog/orchestration-private-cloud, Mar. 28, 2017, 3 pages.

(Continued)

*Primary Examiner* — Karen C Tang
(74) *Attorney, Agent, or Firm* — Lowenstein Sandler LLP (57) ABSTRACT

Implementations for generating scenarios for automated execution of resources in a cloud computing environment are described. An example method may include receiving, by a processing device, identification of a plurality of resources for inclusion in a scenario, the scenario to cause the plurality of resources to be deployed in a cloud computing system, generating, by the processing device, the scenario specifying the plurality of resources and defining relationships between the plurality of resources, receiving a command to invocate the scenario, and in response to receiving the command, causing the plurality of resources to be deployed in the cloud computing system in view of the scenario, the plurality of deployed resources to have the defined relationships.

19 Claims, 6 Drawing Sheets

(56) References Cited

U.S. PATENT DOCUMENTS

| | | | | |
|---|---|---|---|---|
| 2012/0185913 | A1* | 7/2012 | Martinez | H04L 12/66 726/1 |
| 2013/0198607 | A1* | 8/2013 | Mischook | G06F 16/9577 715/234 |
| 2013/0238805 | A1* | 9/2013 | Catrein | H04L 47/70 709/226 |
| 2014/0108914 | A1* | 4/2014 | Qu | G06F 40/14 715/234 |
| 2015/0365349 | A1* | 12/2015 | Verma | H04L 47/70 709/226 |
| 2016/0077880 | A1* | 3/2016 | Santos | G06Q 10/0631 718/104 |
| 2016/0105493 | A1* | 4/2016 | Bacher | H04L 67/10 709/217 |
| 2018/0075009 | A1 | 3/2018 | Baryshnikov et al. | |
| 2018/0165122 | A1* | 6/2018 | Dobrev | G06F 9/45558 |
| 2019/0034298 | A1 | 1/2019 | Maskalik et al. | |
| 2020/0057841 | A1* | 2/2020 | Chowdhury | H04L 63/102 |
| 2020/0201682 | A1* | 6/2020 | Gossman | G06F 9/4881 |

OTHER PUBLICATIONS

Micro Focus, NetIQ, "Understanding Cloud Manager Orchestration Architecture", https://www.netiq.com/documentation/cloud-manager-2-5/ncm-overview/data/ba5bv22.html, 2018, 1 page.

Rajagopalan, Shyamal, IBM, "End-to-End Scenario for Shared Parameters in Cloud Automation Manager", https://developer.ibm.com/cloudautomation/tutorials/end-end-scenario-shared-parameters-cloud-automation-manager/, Apr. 30, 2018, 13 pages.

* cited by examiner

GENERATING SCENARIOS FOR AUTOMATED EXECUTION OF RESOURCES IN A CLOUD COMPUTING ENVIRONMENT

TECHNICAL FIELD

The disclosure is generally related to cloud computing systems, and more particularly, to generating scenarios for automated execution of resources in a cloud computing environment.

BACKGROUND

Cloud computing is generally becoming the platform of choice for businesses that want to reduce operating expenses and be able to scale resources rapidly. Eased automation, flexibility, mobility, resiliency, and redundancy are several of the advantages of moving resources to the cloud. Many organizations are being introduced to cloud computing by building an Infrastructure-as-a-Service (IaaS) cloud, which delivers computing, storage, and networking resources to users. A resource or set of resources may be initialized in the IaaS cloud using scripts and orchestration templates.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein is a system for generating scenarios for automated execution of resources in a cloud computing environment. The cloud computing environment may refer to a collection of resources that deliver computing services to users over a network. A management server can manage the deployment of resources in the cloud computing environment (also referred to herein as cloud computing system or cloud). The management server may receive input describing resources to be deployed in the cloud computing environment. Resources may refer to computing resources and configuration resources. Computing resources may be executed to provide a particular functionality in the cloud computing environment. A computing resource may refer to, but is not limited to, an application, web server, a database server, a router, a load balancer, and so on. A configuration resource may be assigned to or associated with a computing resource to define the computing resource. A configuration resource may include, but is not limited to, a network definition, a subnet definition, a port identifier, a floating Internet Protocol (IP) address, a volume definition, a security group definition, and so on.

The deployment of the resources, including computing resources and configuration resources described above, may enable the execution of applications via the cloud computing environment. In some cases, several resources may be used to execute an application, with each resource providing support for execution of one or more components of the application. The management server can provide resource deployment data for the resource(s) based on user input. The resource deployment data can be described in a structured format that specifies the description, template version, parameter groups, parameters, resources, output, and conditions of a particular resource. The resource deployment data can be a hierarchy of data that includes templates corresponding to deployable resources. The resource deployment data, which may also be referred to as a template, can be parsed and executed to cause the associated resource to be deployed in the cloud. A template may refer to a description of a disk image and meta-data for creating a resource, where the resource can be deployed in the cloud based on a template. A template can be described by a test file, a YAML file, an XML file, or other types of files.

In addition, scripts may be utilized with the template to cause the corresponding resource to be deployed in the cloud computing environment. Scripts may refer to a program or sequence of instructions that is interpreted or carried out by another program to automate a set of tasks. Scripts may be utilized with templates of a resource to cause the resource to be deployed in the cloud.

Upon receiving a command identifying a specific template to deploy for a resource, the management server can retrieve a reference to the existing template for the resource. In conventional systems, managing templates and scripts associated with a bundle of resources can be challenging. Managing such templates and scripts can be difficult as such management can require expertise and knowledge to read and write the templates and scripts. Furthermore, management of the templates and scripts is a high-maintenance task because when the bundle of resources change, the corresponding templates and scripts should be updated. In addition, templates and scripts are typically not part of a cloud interface. As a result, the ability to find and use such templates and scripts can be obstacle for some users. Furthermore, in most cases, a single resource is not usually created/deployed by a user device, but rather a bundle of resources is created/deployed. Furthermore, this same bundle of resources may be repeatedly selected and deployed.

In implementations of the disclosure, a management server may provide for the generation of a "scenario" to encompass a collection of resources frequently created and deployed in a cloud computing environment. A scenario refers to herein a collection of connected resources and defined relationships between those resources. The generated scenario enables the automated deployment of the resources according to the defined relationships in the cloud computing environment. For example, a common scenario may include deploying a computing instance (e.g., virtual machine having web server functionality) with a floating IP address that involves the creation of the following resources:

computing instance (e.g., virtual machine providing a web server functionality), network, subnet, port, and floating IP address.

Aspects of the disclosure address the above and other deficiencies by providing technology that generates the scenarios for automated deployment of resources in a cloud computing environment. In implementations of the disclosure, a scenario manager of the management server configures and maintains the scenarios (e.g., collection of connected resources and defined relationships) that can be deployed. The scenarios may be identified by the scenario manager based on usage trends and/or specified definitions. The scenarios can be selected for deployment and cause the collection of resources associated with the scenario to be deployed on the cloud. The scenario further include defined relationships between the resources that may refer to instructions and/or scripts that cause the scenarios to be deployed in a particular order with respect to one another. When a user (e.g., a system administrator) would like to deploy a scenario, the user can invoke a command identifying the name of the scenario, which causes the collection of resources associated with the scenario to be deployed in the cloud computing environment in an efficient and automated manner.

Furthermore, implementations of the disclosure monitor usage of generated scenarios to provide suggestions for deletion/removal of scenarios. For example, the scenario manager may determine whether a scenario has been deployed less than a threshold number of times over a determined time interval and, if so, recommends deletion of the scenario. The scenario manager deletes the scenario in an automated fashion or in response to confirmation of the suggested deletion.

As such, the systems and methods described herein include technology that enhances utilization of computing resources, such as processor usage and memory usage, for a computer system. In particular, aspects of the disclosure provide technology that enhances the efficiency and/or performance of a computing system by reducing network communications utilized to deploy a bundle of resources of a scenario. This may enhance the efficiency and performance of the computer system by reducing processor usage and improving network bandwidth.

Various aspects of the above referenced methods and systems are described in details herein below by way of examples, rather than by way of limitation.

Figure 1:
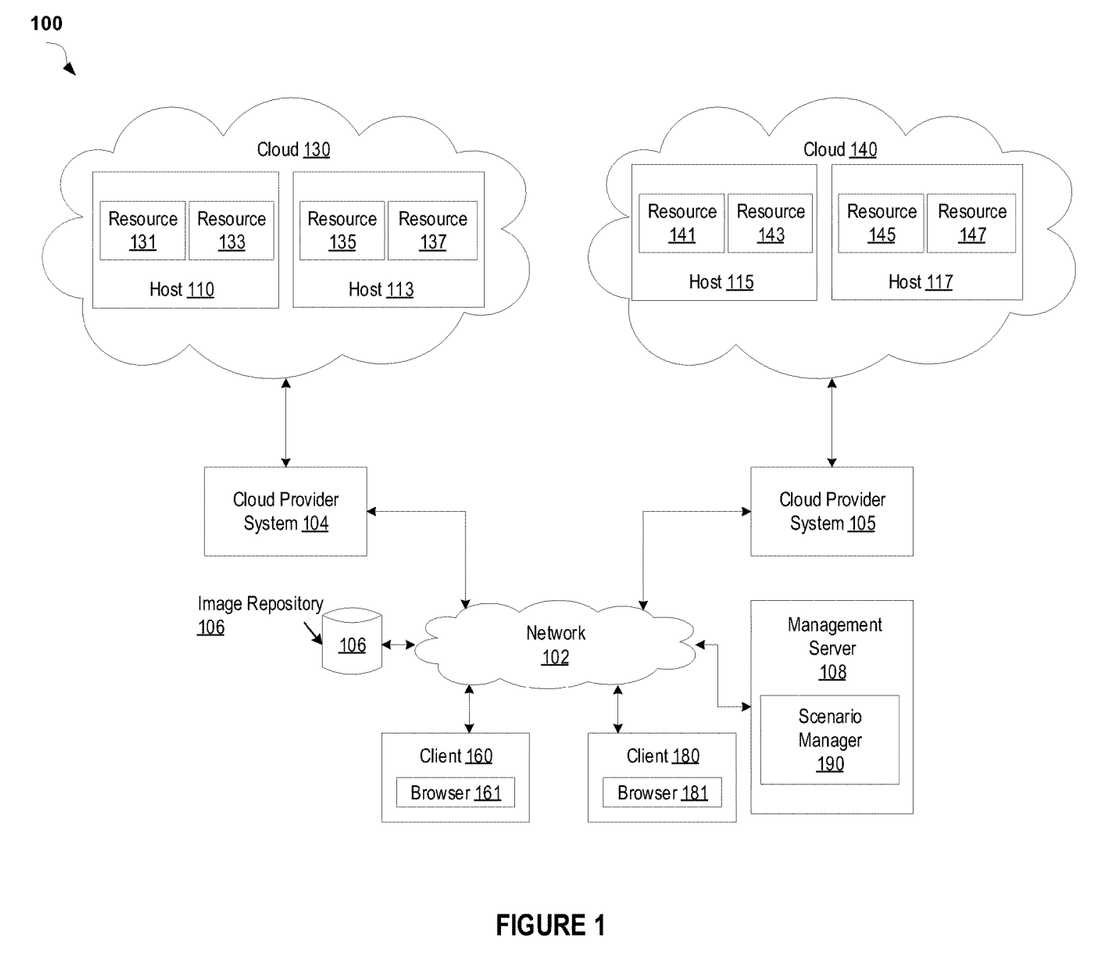
FIG. 1 depicts a high-level block diagram of an example computer system architecture, in accordance with one or more aspects of the disclosure.

FIG. 1 is a block diagram of a network architecture 100 for a distributed computing system, in which embodiments of the invention may operate. The network architecture 100 can include multiple clouds (networks of computing resources) 130, 140 managed by various cloud provider systems 104, 105. There can be any number of clouds 130, 140 and cloud provider systems 104, 105. For brevity and simplicity, two clouds 130, 140 are used as an example throughout this document. In an embodiment, the network architecture includes clouds from multiple cloud providers, and multiple clouds can be provided by a cloud provider. The clouds 130, 140 provide resources 131-137, 141-147. There can be any number of resources 131-137, 141-147 in a cloud 130, 140. For brevity and simplicity, four resources 131-137, 141-147 in each cloud 130, 140 are used as an example in architecture 100. For example, cloud 130 provides resources 131, 133, 135, and 137, and cloud 140 provides resources 141, 143, 145, and 147.

Resources 131-137, 141-147, as discussed herein, may refer to either a computing resource or a configuration resource. Computing resources may be executed to provide a particular functionality in the cloud computing environment. A computing resource may refer to, but is not limited to, an application, web server, a database server, a router, a load balancer, and so on. A configuration resource may be assigned to or associated with a computing resource to define the computing resource. A configuration resource may include, but is not limited to, a network definition, a subnet definition, a port identifier, a floating Internet Protocol (IP) address, a volume definition, a security group definition, and so on.

Each resource 131-137, 141-147 is hosted or enabled on a physical machine configured as part of the cloud 130, 140. Such physical machines are often located in a data center. For example, resources 131 and 133 are hosted on host 110 in cloud 130 provided by cloud provider system 104, resources 135 and 137 are hosted on host 113 in cloud 130 provided by cloud provider system 104, resources 141 and 143 are hosted on host 115 in cloud 140 provided by cloud provider system 105, and resources 145 and 147 are hosted on host 117 in cloud 140 provided by cloud provider system 105. Some resources 131-137, 141-147 may be depend from or be associated with other resources 131-137, 141-147. For example, a cloud instance resource may be associated with a network resource, a security group resource, a volume resource, and so on.

The cloud provider systems 104, 105 and clouds 130, 140 may be provided as an infrastructure as a service (IaaS) layer. The cloud provider systems 104, 105 and clouds 130, 140 may be provided by, for example, a third party cloud provider or an organization including consumers of cloud 130, 140. For example, cloud provider system 104 and cloud 130 may be provided by Cloud-Provider-1, and cloud provider system 105 and cloud 140 may be provided by Cloud-Provider-2. A cloud provider can provide more than one type of cloud provider system 104, 105 and more than one type of cloud 130, 140. The cloud provider can be an entity. An entity, as referred to here, can represent any person, a business organization such as a corporation, an educational institution such as a college or university, etc. Users can interact with applications executing on cloud-based virtual machines using client computer systems, such as clients 160, 180, via corresponding web browser programs 161, 181. Users may have one or more accounts associated with a cloud provider system 104, 105.

Clients 160, 180 are connected to hosts 110, 113, 115, 117 and cloud provider systems 104, 105 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 113, 115, 117 may be a server computer system, a desktop computer or any other computing device. The cloud provider system 104, 105 may include one or more machines such as server computers, desktop computers, etc.

In one embodiment, the cloud provider system 104, 105 is coupled to a management server 108 via the network 102. The management server 108 may include a scenario manager 190, which may reside on the same machine or different machines (e.g., server computers, desktop computers, etc.). The management server 108 may be maintained by a cloud consumer of cloud 130, 140 such as an enterprise (e.g., business, company, organization, etc.). In another embodiment, the management server 108 may be maintained by a third party cloud provider. In yet another embodiment, the management server 108 may be part of the cloud provider system 104, 105.

The management server 108 may manage the deployment of resources 131-137, 141-147 in the cloud 130, 140. The management server 108 may receive input, for example, from a system administrator via a client 160, 180, describing resources 131, 133, 135, 137, 141, 143, 145, 147 to be deployed in the cloud 130, 140. In one implementation, the deployment of the resources 131-137, 141-147 enables the execution of one or more applications via the cloud 130, 140. As discussed above, a resource 131-137, 141-147 may enable the execution of one or more applications. Alternatively, several resources 131-137, 141-147 may be used to execute a single application (a composite application), with each resources 131-137, 141-147 providing support for execution of one or more components of a composite application. An image repository 106 can be populated with resource deployment data to be used to deploy the resources 131-137, 141-147.

In one embodiment, the management server 108 generates the resource deployment data based on the user input and stores the resource deployment data in the image repository 106. The repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The resource deployment data can be described in a structured format that specifies the description, template version, parameter groups, parameters, resources, output, and conditions of a particular resource. The resource deployment data can be a hierarchy of data that includes templates corresponding to deployable resources. The resource deployment data, such as a template, can be parsed and executed to cause the associated resource 131-137, 141-147 to be deployed in the cloud 130, 140.

A template may refer to a description of a disk image and meta-data for creating a cloud resource 131-137, 141-147. A resource can be deployed in the cloud 130, 140 based on a template. A template can be described by a test file, a YAML file, an XML file, or other types of files. The following is an example of an resource template:
template_version: 2015-04-30
description: Simple template to deploy a single compute instance
resources:
  my_instance:
    type: OS::Nova::Server
    properties:
      key_name: my_key
      image: F18-x86_64-cfntools
      flavor: m1.small The template version can refer to a key with a value that indicates a specified version of the template. The description section that allows for providing a description of the template, or the workload that can be deployed using the template. The parameter group section allows for specifying how the input parameters should be grouped and the order to provide the parameters in. This section is optional and can be omitted if preferred. The parameters section allows for specifying input parameters that have to be provided when instantiating the template. The parameters section may be optional and also may be omitted when no input is required. The resources section includes the declaration of the single resources of the template. This section with at least one resource should be defined in any template, or the template would not perform any function when instantiated. The outputs section allows for specifying output parameters available to users once the template has been instantiated. This section may be optional and may be omitted when no output values are required. The conditions section, which can be optional, includes statements that can be used to restrict when a resource is created or when a property is defined. The conditions can be associated with resources and resource properties in the resources section, and also can be associated with outputs in the outputs section of a template.

Upon receiving a command identifying a specific template to deploy for a resource 131-137, 141-147, the cloud provider system 104, 105 retrieves a reference to the existing template for the resource. The command may be received from the management server 108 or a user (e.g., a system administrator) via a console computer or a client machine 160, 180. The resources 131-137, 141-147 can be deployed in the cloud 130, 140.

As discussed above, in most cases, a single resource 131-137, 141-147 is not usually be created/deployed in the cloud, but rather a bundle of resources is created/deployed. Furthermore, this same bundle of resources may be repeatedly selected and deployed. In implementations of the disclosure, this bundle of resources can reflect a "scenario". As discussed above, a scenario refers to herein a collection of connected resources and defined relationships between those resources. The generated scenario enables the automated deployment of the resources 131-137, 141-147 according to the defined relationships in the cloud 130, 140. For example, a common scenario may include deploying a computing instance (e.g., virtual machine having web server functionality) with a floating IP address that involves the creation of the following resources: computing instance (e.g., virtual machine providing a web server functionality), network, subnet, port, and floating IP address.

In implementations of the disclosure, the scenario manager 190 of the management server 108 provides scenarios that can be deployed based on usage trends and/or specified definitions. The scenarios can be selected for deployment and cause the bundle of resources associated with the selected scenario to be deployed on the cloud 130, 140 in accordance with relationships between the resources as defined by the scenario. Further discussion of the creation and delivery of scenarios by the scenario manager 190 is described below with respect to FIG. 2.

Figure 2:
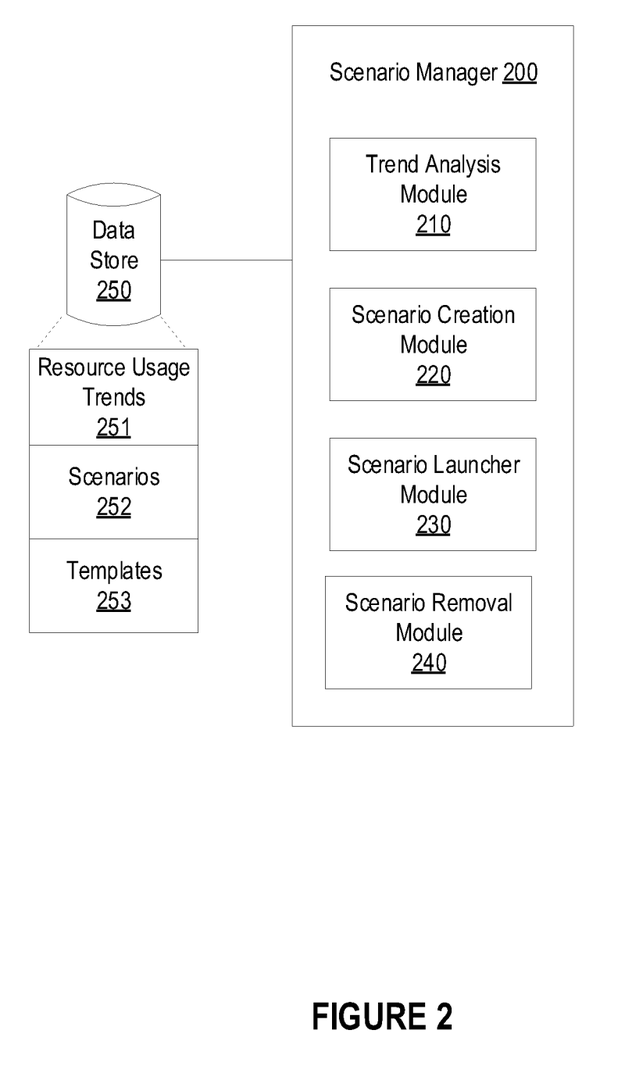
FIG. 2 depicts an example scenario manager, according to one or more aspects of the disclosure.

FIG. 2 illustrates a block diagram of one embodiment of scenario manager 200 in accordance with implementations of the disclosure. In one embodiment, the scenario manager 200 can be the same as the scenario manager 190 of FIG. 1. Scenario manager 200 includes a trend analysis module 210, a scenario creation module 203, a scenario launcher module 230, and a scenario removal module 240. Note that in alternative embodiments, the scenario manager 200 may include more or less modules than those shown in FIG. 2. Also, one or more of the trend analysis module 210, scenario creation module 220, scenario launcher module 230, and/or scenario removal module 240 may be combined into a single module. Additionally, the functionality of any of the trend analysis module 210, scenario creation module 220, scenario launcher module 230, and/or scenario removal module 240 may be divided between multiple modules.

In one embodiment, trend analysis module 210 monitors usage of currently-deployed resources in the cloud by one or more users. The trend analysis module 210 may monitor which groups of resources are used more often than others and pass these identified groups of resources to the scenario creation module 220. In one implementation, "usage" of a resource may refer to initialization and/or deployment of the resource in the cloud. The trends analysis module 210 may store data associated with the resource usage in resource usage trends 251 of data store 250. Data store 250 may be the same as data store 106 described with respect to FIG. 1. In some implementations, data store 250 is a separate data store than data store 106.

In some implementations, the trend analysis module 210 is configured with a monitoring time interval. For example, the trend analysis module 210 may be configured to monitor the creation of resources in the cloud over twenty minute intervals. In this example, every twenty minutes, the trend analysis module 210 may examine all resources created in the twenty minute interval and return those resources created most frequently (e.g., exceeding a configurable threshold number of creations). In some implementations, the trend analysis module 210 is also configured with a maximum number of scenarios to identify.

In some implementations, the order of resource initialization/deployment is also taken into account by the trend analysis module 210. For example, if there are four users that have all created the same resources but in different orders, then the trend analysis module 210 may consider each of these groups of resources as different scenarios. In some implementations, the trend analysis module 210 may be configured to disregard the order of resource creation and consider certain sets of resources as the same scenario regardless of the order of creation of the resources.

In one implementation, the scenarios identified by the trends analysis module 210 may be provided to a user (e.g., an administrator) to identify popular scenarios that the organization of the user (or the user himself/herself) may be utilizing. This scenario information may be useful to recommendations regarding paid subscription services for cloud provider systems. For example, the scenarios returned from the trends analysis module 210 may provide information on services that the user/organization is or is not using from a cloud provider systems, from which the user may take action in modifying subscription services to the cloud provider systems.

The scenario creation module 220 may generate scenarios based on the input received from the trend analysis module 210 or based on specified input from a user. A scenario may be created by combining templates (may be stored as templates 252 of data store 106) corresponding to the resources of the scenario in accordance with defined relationships between the resources (e.g., an order of the resource deployment, relationship between the resources, etc.). In one implementation, the scenario combines the resources according to their relationships into a single script that is deployable on the cloud to cause initialization of the resources of the scenario in a particular order. When generating the scenario 253, the scenario creation module 220 may tag all of the resources in the scenario with the same tag. In one implementation, the tag is a universally unique identifier (UUID). The resources of the scenario 253 are tagged with the same UUID in order to bundle all of the resources logically to identify the resources as part of the same scenario 253.

The generated scenario may be stored in scenarios 253 of data store 250. In one implementation, the generated scenario 253 may reference existing templates 252 of the resources and further includes a sequence of instructions (e.g., scripting language) that defines the relationship between the resources so that the deployment of the particular templates 252 occurs together in a particular order to effectuate the scenario. In some implementations, the generated scenario 253 is a new template, having a group of defined resources with defined relationships, that can be deployed on the cloud.

As noted above, the templates 252 used to generate a scenario 253 may be identified based on the feedback from the trend analysis module 210. In one implementation, the templates 252 used to generate a scenario 253 may also be identified based on specified user input. In this case, the scenario creation module 220 may receive identification of resources and variable values associated with those resources.

A user may provide this information to the scenario creation module 220 in a variety of ways. In on implementations, the user may provide a file including, but not limited to, the name of the scenario, a list of the resources, and variables corresponding to the resources. The file may be a YAML file, JavaScript Object Notation (JSON) file, comma-separated value (CSV) file, and so on. The file may be provided to the scenario creation module 220 using a command via a command line interface (CLI) or via an interactive session with the management server (e.g., management server 108 of FIG. 1) of the cloud management platform.

In one implementation, the specified user input utilized to generate a scenario may include the user marking the resources of the scenario with a specific tag. The user may then request the scenario manager 200 to generate a scenario using the resources that are marked with the specific tag. In one implementation, the specified user input utilized to generate a scenario includes providing an existing scenario template to the scenario manager 200. The existing scenario template may identify the resources included in the scenario and may be utilized to deploy the scenario in the cloud.

Once the scenario is generated by the scenario creation module 220, the scenario launcher module 230 can cause the scenario to be deployed (e.g., launched) in the cloud. In one implementation, the user (e.g., an administrator) may invocate the scenario using a command (e.g., "list scenarios"). When the command is invocated, the user can be provided with a list of scenarios 253 that the scenario manager 200 generated. If the user identifies a scenario of interest to deploy, the user can then provide another command that causes the particular scenario to be deployed.

In one implementation, the scenario launcher module 230 may obtain, from the user, values of variables (e.g., how much RAM, how many CPUs, etc.) used to deploy the scenario. The scenario launcher module 230 may generate an interactive session with the user to query the user for the value of the particular variables of the scenario. In some implementations, the user may provide the scenario launcher module 230 with a file (e.g., an answer file) that include all of the variables for the scenario and the associated values for the variables.

Once the scenario launcher module 230 receives the variable value, the scenario launcher module 230 can cause the identified scenario to be deployed in the cloud. In some implementations, the user may create multiple invocations of the same scenario.

The scenario removal module 240 may remove scenarios from the scenario manager 200. In one implementation, the scenario remove module 240 may identify scenarios that satisfy configurable parameters for removal. In some implementation, the parameters for removal may include falling below a threshold number of times of use in a determined time period. For example, the scenario removal module 240 may identify scenarios 253 that have been used less than one time in the past two months. The configuration parameters and scenario use information may be stored in scenarios 252 of the data store 250.

In one implementation, the scenario removal manager 240 may utilize a counter or other tracking component to mark the use of a scenario each time it is deployed. The counter may be initialized at the beginning of the configured tracking time period. Once the tracking time period expires, the scenario removal manager 240 may then reference the counter to determine whether the scenario satisfies the removal parameters. If so, the scenario removal module 240 may automatically remove the scenario 253. In one implementation, the scenario removal module 240 may send a notification to the user that the scenario is suggested for removal. If the user confirm removal of the scenario, the scenario removal module 240 can proceed with deleting the scenario 253 from the data store 250.

Figure 3:
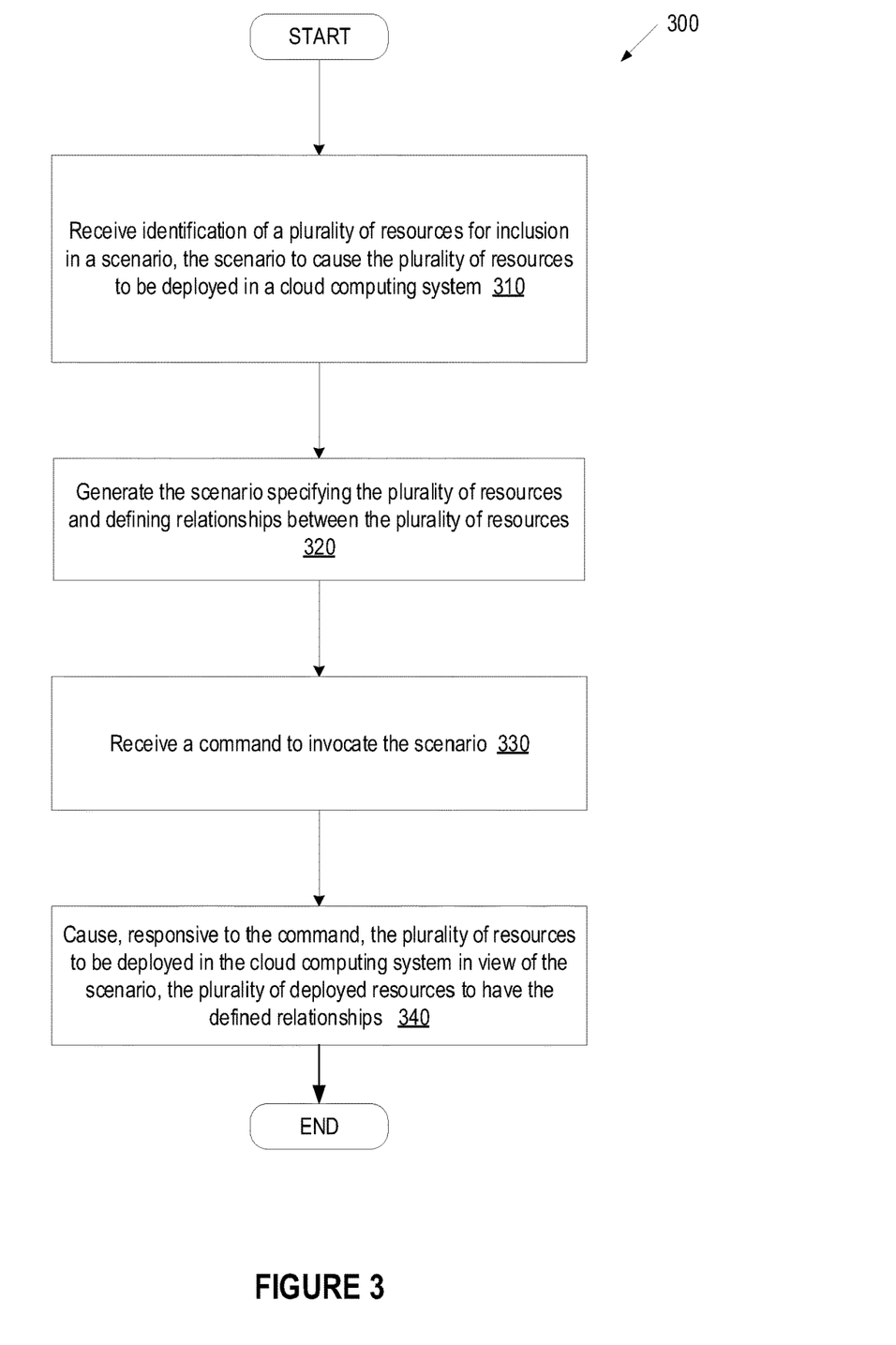
FIG. 3 depicts a flow diagram of an example method for generating scenarios for automated execution of resources in a cloud computing system, in accordance with one or more aspects of the disclosure.
Figure 4:
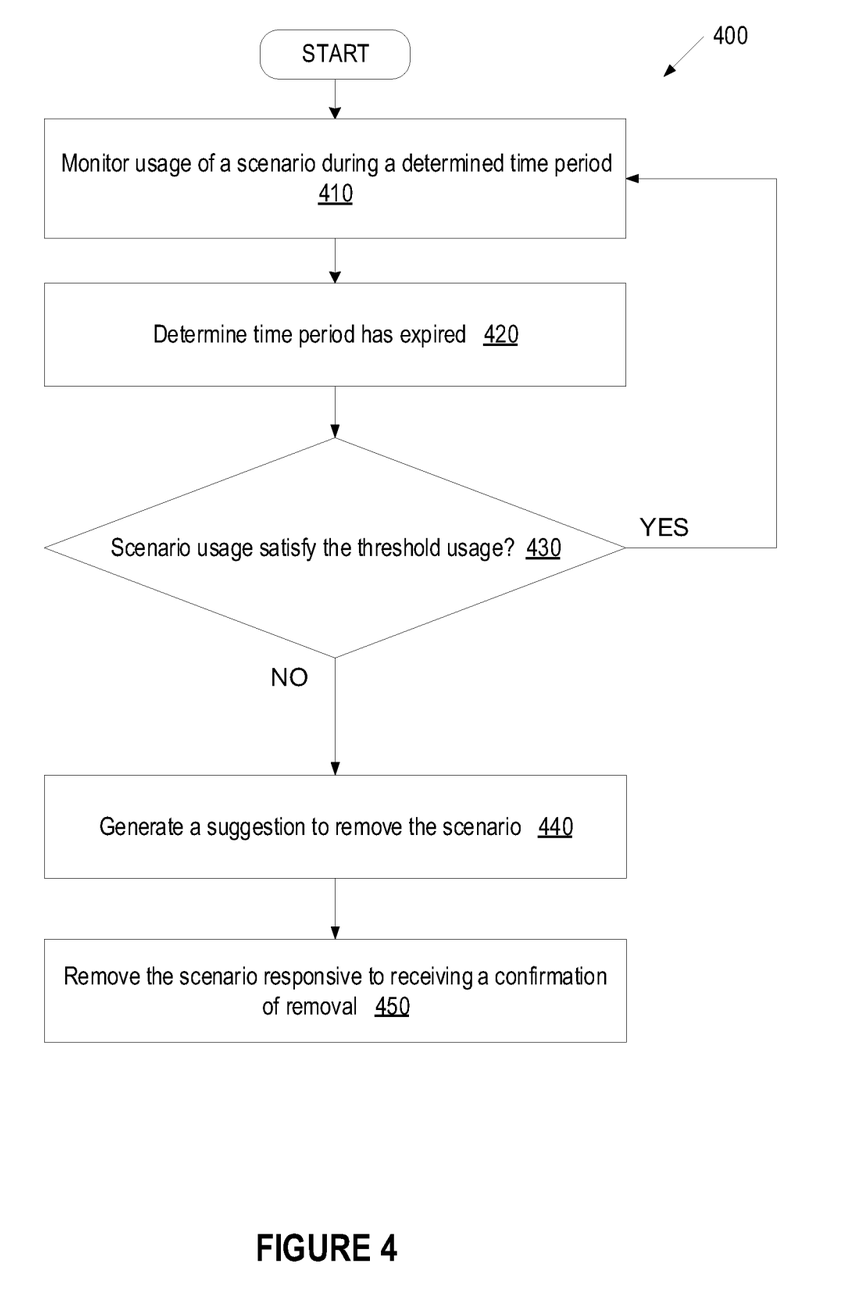
FIG. 4 depicts a flow diagram of an example method for removing scenarios for automated execution of resources in a cloud computing system, in accordance with one or more aspects of the disclosure.

FIGS. 3 and 4 depict flow diagrams for illustrative examples of methods 300 and 400 for generating scenarios for automated execution of resources in a cloud computing environment, in accordance with one or more aspects of the disclosure. Method 300 illustrates an example process flow for generating a CLI for projects based on configuration management technologies, according to at least one implementation. Method 400 is an example process flow for removing scenarios in a cloud computing environment, according to at least one implementation.

Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by scenario manager 190 as shown in FIG. 1.

Referring to FIG. 3, method 300 may be performed by processing devices of a server device or a client device and may begin at block 310. At block 310, a processing device may receive identification of a plurality of resources for inclusion in a scenario. In one implementation, the scenario can cause the plurality of resources to be deployed in a cloud computing system. In one implementation, the plurality of resources includes one or more computing resources and one or more configuration resources. The computing resources may include an application, a web server, a database server, a router, or a load balancer, for example. The one or more configuration resources may include a network definition, a subnet definition, a port identifier, a floating IP address, a volume identifier, or a security group definition. Each of the plurality of resources is defined in a template of a management server for the cloud computing system.

At block 320, the processing device may generate the scenario. In one implementation, the generated scenario may include plurality of resources and may define relationships between the plurality of resources. The, at block 330, the processing device may receive a command to invocate the scenario. Lastly, at block 340, the processing device may cause, in response to receiving the command, the plurality of resources to be deployed in the cloud computing system in view of the scenario. In one implementation, the plurality of deployed resources may have the defined relationships.

Referring to FIG. 4, method 400 may be performed by processing devices of a server device or a client device and may begin at block 410. At block 410, a processing device may monitor usage of a scenario during a determined time period. In one implementation, the scenario can cause the plurality of resources to be deployed in a cloud computing system. In one implementation, the plurality of resources includes at least one of a cloud instance, a network, a subnet, a port, a floating IP address, volumes, security groups, or users. Each of the plurality of resource may also correspond to a template of a management server for the cloud computing system. In one implementation, the determined time period is an interval of time configured by a user (e.g., an administrator).

Subsequently, at block 420, the processing device may determine that the time period has expired. Then at decision block 430, in response to expiration of the time period, determine whether the user of the scenario satisfies a threshold usage. In one implementation, the threshold usage refers to a number of times that the resource is deployed in the cloud computing system. For example, if the scenario is deployed a number of times that is more than the threshold usage, then the scenario usage satisfies the threshold usage. If the scenario usage satisfies the threshold usage at decision block 430, the method 400 returns to block 410. Otherwise, if the scenario usage does not satisfy the threshold usage at decision block 430, then method 400 proceeds to block 440.

At block 440, the processing device may generate a suggestion to remove the scenario. In one implementation, the suggestion is provided to a user with an option to confirm or deny (cancel) the removal. Lastly, at block 450, the processing device may remove the scenario responsive to receiving a confirmation of the removal from the user. In one implementation, if the user does not confirm the removal, then method 400 may return to block 410 to continue monitoring the scenario.

Figure 5:
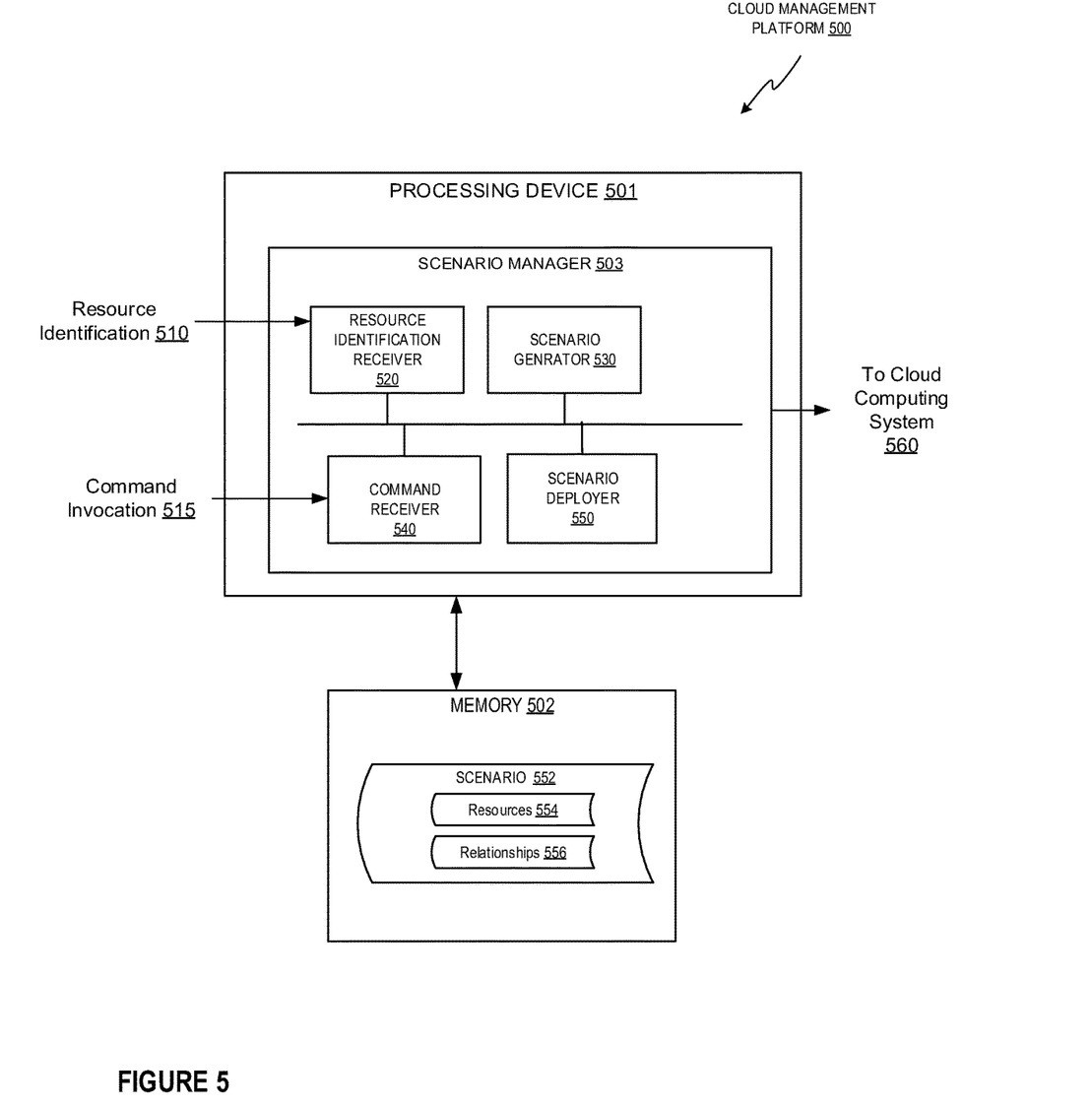
FIG. 5 depicts a block diagram of an example computer system in accordance with one or more aspects of the disclosure.

FIG. 5 depicts a block diagram of a cloud management platform 500 operating in accordance with one or more aspects of the disclosure. Cloud management platform 500 may be the same as management server 108 described with respect to FIG. 1. Cloud management platform 500 may include one or more processing devices 501 and one or more memory devices 502. In the example shown, the processing device 501 of cloud management platform 500 may include a scenario manager 503. Scenario manager 503 may be the same as scenario manger 190 described with respect to FIG. 1.

Scenario manager 503 may include a resource identification receiver 520, a scenario generator 530, a command receiver 540, and a scenario deployer 550. The resource identification receiver 520 may enable the processing device 501 to receive identification 510 of a plurality of resources 552 for inclusion in a scenario 552. In one implementation, the scenario 552 can cause the plurality of resources 554 to be deployed in a cloud computing system 560. The scenario generator 530 may enable the processing device 501 to generate the scenario 552 comprising the plurality of resources 554 and defined relationships 556 between the plurality of resources.

In one implementation, the command receiver 540 may enable the processing device 501 to receive a command 515 to invoke the scenario 552. The scenario deployer 550 may enable the processing device 501 to cause, in response to receiving the command 515, the plurality of resources 554 to be deployed in the cloud computing system 560 in view of the scenario 552. In one implementation, the plurality of deployed resources 554 have the defined relationships 556.

Figure 6:
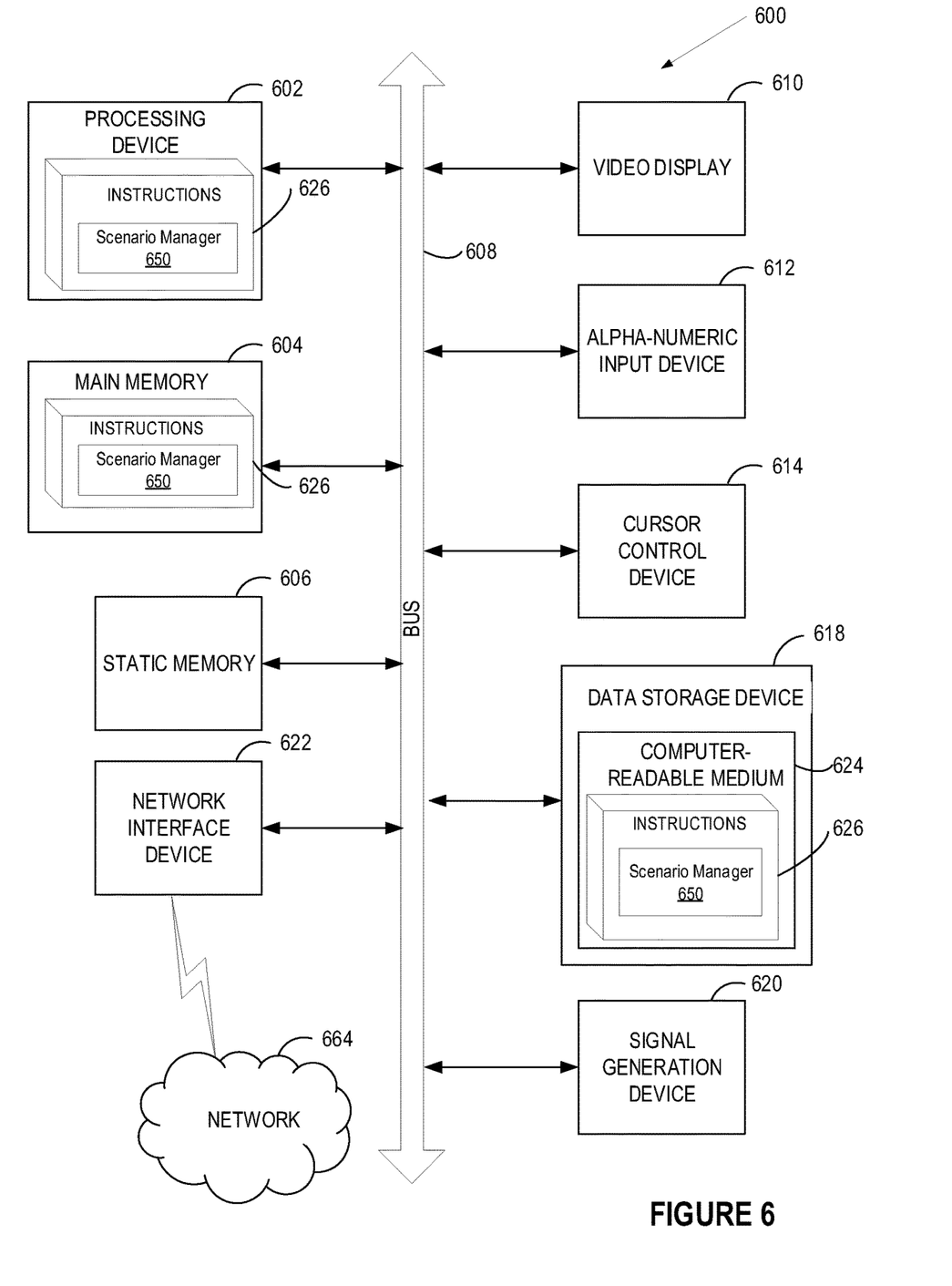
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 400 for scenario manager 650 (which may be the same as scenario manager 190 of FIG. 1 and/or scenario manager 200 of FIG. 2) and the modules illustrated in FIGS. 1, 2, and 5.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
   monitoring, by a processing device, usage of multiple resources deployed in a cloud computing system;
   identifying, in view of the usage during a determined time interval, a plurality of resources from the multiple resources as candidates for a scenario of deploying the plurality of resources in the cloud computing system, wherein each resource of the plurality of resources was created a determined minimum amount of number of times during the determined time interval;
   receiving, by the processing device, identification of the plurality of resources for inclusion in the scenario;
   generating, by the processing device, the scenario specifying the plurality of resources and defining relationships between the plurality of resources, wherein the relationships indicate an order for deploying the plurality of resources in the cloud computing system;
   receiving a command to invocate the scenario; and
   in response to receiving the command, causing the plurality of resources to be deployed in the cloud computing system in view of the scenario, the plurality of deployed resources to have the defined relationships.

2. The method of claim 1, wherein the plurality of resources comprise one or more computing resources and one or more configuration resources, wherein the one or more computing resources comprise at least one of an application, a web server, a database server, a router, or a load balancer, wherein the one or more configuration resources comprise at least one of a network definition, a subnet definition, a port identifier, a floating Internet Protocol (IP) address, a volume identifier, or a security group definition, and wherein each of the plurality of resources corresponds to a template of a management server for the cloud computing system.

3. The method of claim 1, wherein receiving identification of the plurality of resources comprises receiving user input to identify the plurality of resources from a user device of a user.

4. The method of claim 1, wherein causing the plurality of resources to be deployed in the cloud computing environment comprises obtaining values of one or more variables corresponding to the plurality of resources.

5. The method of claim 1, wherein generating the scenario is performed without user intervention.

6. The method of claim 1, wherein generating the scenario comprising combining the plurality of resources and the defined relationships between the plurality of resources into a scenario template that enables deployment of the plurality of resources on the cloud computing system.

7. The method of claim 1, further comprising:
   monitoring usage of the resource; and
   removing the resource in response to the usage of the resource satisfying one or more removal parameters.

8. The method of claim 7, wherein the one or more removal parameters comprises at least one of a time interval of the usage or a number of times of deployment of the resource.

9. The method of claim 1, wherein monitoring the usage of the multiple resources is performed during a predetermined time interval.

10. The method of claim 1, wherein the usage comprises at least one of initialization of a resource in the cloud computing system or deployment of the resource in the cloud computing system.

11. A system comprising:
    a memory; and
    a processing device communicably coupled to the memory to:
    monitor usage of multiple resources deployed in a cloud computing system;
    identify, in view of the usage during a determined time interval, a plurality of resources from the multiple resources as candidates for a scenario of deploying the plurality of resources in the cloud computing system, wherein each resource of the plurality of resources was created a determined minimum amount of number of times during the determined time interval;
    receive identification of the plurality of resources for inclusion in the scenario;
    generate the scenario specifying the plurality of resources and defining relationships between the plurality of resources, wherein the relationships indicate an order for deploying the plurality of resources in the cloud computing system;
    receive a command to invocate the scenario; and
    in response to receiving the command, cause the plurality of resources to be deployed in the cloud computing system in view of the scenario, the plurality of deployed resources to have the defined relationships.

12. The system of claim 11, wherein the plurality of resources comprise one or more computing resources and one or more configuration resources, wherein the one or more computing resources comprise at least one of an application, a web server, a database server, a router, or a load balancer, wherein the one or more configuration resources comprise at least one of a network definition, a subnet definition, a port identifier, a floating Internet Protocol (IP) address, a volume identifier, or a security group definition, and wherein each of the plurality of resources corresponds to a template of a management server for the cloud computing system.

13. The system of claim 11, wherein the processing device to receive identification of the plurality of resources further comprises the processing device to receive user input to identify the plurality of resources from a user device of a user.

14. The system of claim 11, wherein the processing device to cause the plurality of resources to be deployed in the cloud computing environment further comprises the processing device to obtain values of one or more variables corresponding to the plurality of resources.

15. The system of claim 11, wherein the processing device is further to:
monitor usage of the resource; and
remove the resource in response to the usage of the resource satisfying one or more removal parameters;
wherein the one or more removal parameters comprise at least one of a time interval of the usage or a number of times of deployment of the resource.

16. A non-transitory machine-readable storage medium storing instructions that cause a processing device to:
monitor, by a processor, usage of multiple resources deployed in a cloud computing system;
identify, in view of the usage during a determined time interval, a plurality of resources from the multiple resources as candidates for a scenario of deploying the plurality of resources in the cloud computing system, wherein each resource of the plurality of resources was created a determined minimum amount of number of times during the determined time interval;
receive, by the processing device, identification of the plurality of resources for inclusion in the scenario, the scenario to cause the plurality of resources to be deployed in a cloud computing system;
generate, by the processing device, the scenario specifying the plurality of resources and defining relationships between the plurality of resources, wherein the relationships indicate an order for deploying the plurality of resources in the cloud computing system;
receive a command to invocate the scenario; and
in response to receiving the command, cause the plurality of resources to be deployed in the cloud computing system in view of the scenario, the plurality of deployed resources to have the defined relationships.

17. The non-transitory machine-readable storage medium of claim 16, wherein the plurality of resources comprise one or more computing resources and one or more configuration resources, wherein the one or more computing resources comprise at least one of an application, a web server, a database server, a router, or a load balancer, wherein the one or more configuration resources comprise at least one of a network definition, a subnet definition, a port identifier, a floating Internet Protocol (IP) address, a volume identifier, or a security group definition, and wherein each of the plurality of resources corresponds to a template of a management server for the cloud computing system.

18. The non-transitory machine-readable storage medium of claim 16, wherein the processing device to receive identification of the plurality of resources further comprises the processing device to receive specified identification of the plurality of resources from a user device of a user.

19. The non-transitory machine-readable storage medium of claim 16, wherein the processing device to generate the scenario further comprises the processing device to combine the plurality of resources and the defining relationships between the plurality of resources into a scenario template that enables deployment of the plurality of resources on the cloud computing system.

* * * * *